(12) United States Patent
Roulliere

(10) Patent No.: US 9,262,052 B2
(45) Date of Patent: Feb. 16, 2016

(54) METHOD AND DEVICE FOR CONTROLLING THE DISPLAY OF A PLURALITY OF ELEMENTS OF A LIST ON A DISPLAY DEVICE

(75) Inventor: Stephane Roulliere, Rennes (FR)

(73) Assignee: Orange, Paris (FR)

( * ) Notice: Subject to any disclaimer, the term of this patent is extended or adjusted under 35 U.S.C. 154(b) by 238 days.

(21) Appl. No.: 12/973,516

(22) Filed: Dec. 20, 2010

(65) Prior Publication Data

US 2011/0154263 A1  Jun. 23, 2011

(30) Foreign Application Priority Data

Dec. 21, 2009  (FR) ...................... 09 59298

(51) Int. Cl.
*G06F 3/0485* (2013.01)
*G06F 3/0488* (2013.01)
*G06F 3/0482* (2013.01)

(52) U.S. Cl.
CPC ............ *G06F 3/0482* (2013.01); *G06F 3/0485* (2013.01); *G06F 3/0488* (2013.01); *G06F 3/04883* (2013.01); *G06F 2203/04808* (2013.01)

(58) Field of Classification Search
CPC ................ G06F 3/0488; G06F 3/0485; G06F 2203/04808; G06F 3/04883; G06F 3/0482
USPC .................................................. 715/784, 830
See application file for complete search history.

(56) References Cited

U.S. PATENT DOCUMENTS

| | | | | |
|---|---|---|---|---|
| 5,295,242 A | * | 3/1994 | Mashruwala | G06F 3/0481 715/835 |
| 8,036,714 B2 | | 10/2011 | Kwon et al. | |
| 2006/0246940 A1 | * | 11/2006 | Foxenland | 455/550.1 |
| 2007/0229465 A1 | * | 10/2007 | Sakai et al. | 345/173 |
| 2007/0245260 A1 | * | 10/2007 | Koppert | 715/784 |
| 2008/0222559 A1 | * | 9/2008 | Kim | 715/785 |
| 2008/0270886 A1 | * | 10/2008 | Gossweiler et al. | 715/227 |
| 2009/0121903 A1 | | 5/2009 | Misage | |
| 2009/0237371 A1 | | 9/2009 | Kim et al. | |
| 2009/0282360 A1 | * | 11/2009 | Park et al. | 715/786 |
| 2010/0056219 A1 | | 3/2010 | Kwon et al. | |
| 2010/0134425 A1 | * | 6/2010 | Storrusten | 345/173 |
| 2011/0050588 A1 | * | 3/2011 | Li et al. | 345/173 |

FOREIGN PATENT DOCUMENTS

| | | |
|---|---|---|
| EP | 2 045 703 | 4/2009 |
| EP | 2 116 927 | 11/2009 |
| WO | WO 2008/000435 A1 | 1/2008 |

OTHER PUBLICATIONS

Yun and Lee, "Design and Comparison of Acceleration Methods for Touchpad" in CHI EA '07: CHI '07 Extended Abstracts on Human Factors in Computing Systems, Apr. 2007, ACM.*

(Continued)

*Primary Examiner* — Aaron Lowenberger
(74) *Attorney, Agent, or Firm* — Knobbe Martens Olson & Bear LLP

(57) ABSTRACT

Elements of a list are caused to scroll in a first display mode on a display device in response to a movement made on a touch interface along a determined scroll axis, and starting from the first mode, a display is triggered on the display device of the list in at least one second display mode in response to a movement made on the touch interface along a trigger axis that is different from the list scroll axis.

18 Claims, 5 Drawing Sheets

(56) References Cited

OTHER PUBLICATIONS

"Subset—Definition", www.merriam-webster.com/dictionary/subset, archivced by the Internet Archive Wayback Machine on Apr. 22, 2009 and retrieved from http://web.archive.org/web/20090422155041/http://www.merriam-webster.com/dictionary/subset on Apr. 23, 2015.*

Sengadir, T., Discrete Mathematics and Combinatorics, Aug. 20, 2008, Pearson India, p. 21.*

* cited by examiner

METHOD AND DEVICE FOR CONTROLLING THE DISPLAY OF A PLURALITY OF ELEMENTS OF A LIST ON A DISPLAY DEVICE

RELATED APPLICATIONS

This application claims the priority of French application no. 09/59298 filed Dec. 21, 2009, the entire content of which is hereby incorporated by reference.

BACKGROUND OF THE INVENTION

The present invention relates to the general field of multimedia applications.

More particularly it relates to using a touch interface to control the display of elements of a list by means of a display device. The elements of the list may in particular be multimedia contents such as video streams, images, applications, data files, etc., and the display device may be a screen, e.g. a computer screen or a TV screen.

The invention thus applies in preferred, but non-limiting manner, to displaying audiovisual content on a screen, e.g. in order to provide a channel-switching service amongst a plurality of channels broadcast by a digital TV operator, or to offer a service of navigating a video catalog.

Over the last few years, there has been considerable development in multimedia equipment fitted with touch interfaces, such as a touch screen or a touchpad.

A touchpad is conventionally used as means for replacing a mouse, in particular on laptop computers. It constitutes a high performance pointer device that enables a cursor to be moved easily on the screen of a computer.

Nevertheless, use thereof becomes more difficult when it is necessary to act on elements displayed on the computer screen.

To mitigate that problem, a touchpad is often associated with one or more buttons located above or below the touchpad and acting as selector buttons in the same manner as the buttons on a mouse, thus limiting the actions that can be performed using the touchpad on its own. Those buttons associated with the touchpad serve in particular to control the display of elements on the screen, where such control is not presently possible in easy and reliable manner using a touchpad.

There thus exists a need to have a method of controlling the display of elements on a display device by means of a touch interface that does not require recourse to additional peripheral equipment such as buttons, and that is equally applicable to utilization of a touch interface in the form of a touchpad or in the form of a touch screen.

Document EP 2 116 927 describes a mobile telephone with a touch screen suitable for displaying a list of messages. Using the touch screen, the user can cause the messages to scroll along a first axis. Furthermore, a movement along a second axis makes it possible, at the location of a selected message, to display some other message associated with the selected message. Nevertheless, it is not possible to increase the quantity of information displayed for a selected message.

SUMMARY OF THE INVENTION

One aspect of the present invention is directed to a control method for controlling the display on a display device of a plurality of elements belonging to a list, wherein, in a first display mode, information is displayed for said elements of the list, with the elements of said list being caused to scroll on the display device in the first display mode in response to a movement made on a touch interface along a determined scroll axis. The method of the invention is remarkable in that, starting from the first display mode, the display device is caused to display said list in at least one second display mode that is triggered in response to a movement made on the touch interface along a trigger axis distinct from the list scroll axis.

Another aspect of the present invention is directed to a control device for controlling the display on a display device of a plurality of elements belonging to a list, wherein, in a first display mode, information is displayed for said elements of the list, said device including means for enabling the elements of the list to scroll in the first display mode on the display device in response to a movement made on a touch interface along a determined scroll axis. In accordance with an embodiment of the invention, the device is remarkable in that it further comprises means for acting, starting from the first display mode, to trigger a display on the display device of said list in at least one second display mode in response to a movement made on the touch interface along a trigger axis distinct from the list scroll axis.

The invention thus makes it possible, in very simple manner, to control the display of elements of a list in a plurality of display modes using a touch interface on its own. Advantageously, the triggering of a new display mode requires only one movement, and is not associated with a specific gesture.

Naturally, the invention is not limited to two display modes, it being possible to trigger a third display mode, then a fourth, etc., in response to each successive movement made on the touch interface along the trigger axis.

Such display modes may present information or functions that are distinct for each element of the list.

Thus, for example, in the second display mode, additional information over and above that displayed in the first display mode is displayed for at least one element of the list.

The displayed information for the elements of the list occupies a portion of the display area of the display device. The greater the quantity of information, the greater the area that is occupied. It is therefore necessary to find a compromise between the quantity of information that is displayed and the area that is occupied. According to and embodiment of the invention, in the first display mode, the occupied area is limited but the quantity of information displayed is also limited, while in the second display mode, the quantity of information that is displayed is greater but so also is the area it occupies. In other words, the first and second display modes correspond to two different compromises between the quantity of information displayed and the area it occupies. By triggering the second display mode, the invention makes it possible to switch from one compromise to the other.

In a variant, in the second display mode, there is displayed for at least one element of the list at least one user interface element suitable for use in triggering the performance of a function associated with said element of the list.

The invention thus makes it possible, via each display mode, to enrich the information or the functions that is/are available for the elements contained in the list.

Having recourse to distinct scroll and trigger axes also provides the possibility of simultaneously activating scrolling of the elements of the list and displaying them in the various display modes.

Nevertheless, triggering the display in the second display mode need not necessarily be simultaneous with triggering scrolling of the list.

Preferably, the axis for triggering the display of the second mode is substantially perpendicular to the list scroll axis.

As a result, it is easier to distinguish between the movement for causing the list to scroll and the movement that triggers the second display mode. This enables greater tolerance relative to the precision required of the movement for triggering the second display mode.

It should be observed that in the meaning of the invention a display mode for displaying the elements of the list may apply to all or only some of the elements of the list. In particular, the display mode may apply to only one particular element, e.g. an element appearing in a focus zone of the display device.

The invention can be used for searching through television channels broadcast by an operator and to switching from one channel to another by means of a remote control incorporating a touch interface. In such a context, each of the elements of the list then represents a TV channel and an associated video stream, while the first and second display modes may refer respectively to the channel numbers and to a miniature image or "thumbnail" representative of the video stream being broadcast on that channel. The invention enables the second display mode to be triggered easily in order to add to the information made available by the remote control.

Nevertheless, other applications can also be envisaged, such as navigating through a list of multimedia contents or software applications or arbitrary data files.

In a particular implementation of the invention, in the second display mode, a movement made on the touch interface along the scroll axis triggers scrolling of the elements of the list with at least one of the elements being displayed in the second display mode.

Scrolling of the list can thus be enabled in each of the display modes.

In a particular implementation of the invention, display in the second display mode is terminated in response to a movement made on the touch interface along said trigger axis in a direction opposite to the direction of the movement made for triggering the display of the second mode.

Correspondingly, the control device may also include means for terminating the display in the second display mode in response to a movement made on the touch interface along said trigger axis, in a direction opposite to the direction of the movement made for triggering the display of the second mode.

Thus, triggering of the second display mode (or more generally the $n^{th}$ display mode) is completely reversible. The solution proposed by the invention is consequently flexible and makes it possible to add and/or remove display modes on the display device easily as a function of the desires of the user of the touch interface.

In another implementation, the scrolling speed of the elements in the list depends on the speed of the movement made on the touch interface along the scroll axis.

Correspondingly, the control device of the invention may also include means for determining the scrolling speed of the elements of said list as a function of the speed of the movement made on the touch interface along the scroll axis.

The user of the touch interface may thus control the speed at which the list scrolls on the display device.

Furthermore, it is possible to apply a deceleration coefficient to the scrolling speed of the elements of the list so as to slow down the scrolling speed progressively.

The invention thus reproduces the movement of a physical wheel in order to present the elements of the list to the user.

In a first variant, the scrolling speed of the elements of the list is slowed down in response to a slow-down movement made on the touch interface along the scroll axis and in a direction opposite to the direction of the movement that causes the list to scroll.

Correspondingly, the control device may also include means for slowing down the scrolling speed of elements of said list in response to a slow-down movement made on the touch interface along the scroll axis and in a direction opposite to the direction of the movement that caused said list to scroll.

In this way, the user of the touch interface can decide the moment from which it is desirable to slow down the scrolling, e.g. when the elements displayed on the display device are coming up to an element the user desires to access or to select.

In a second variant, the scroll speed is slowed down as a function of the pressure exerted on the touch interface during the slow-down movement.

Correspondingly, the control device according to an embodiment of the invention further comprises:
  means for evaluating the pressure exerted on the touch interface during the slow-down movement; and
  means for slowing down the speed at which the elements of the list scroll as a function of the evaluated pressure.

Thus, the user may not only decide when it is desirable to slow down the scrolling of the list, but also on the amplitude of such slowing down, by exerting greater or lesser pressure on the touch interface. For example, the greater the pressure exerted on the touch interface, the greater the deceleration of the scrolling.

In another aspect, the invention provides a system comprising:
  a touch interface; and
  a control device in accordance with the invention, suitable for controlling the display on a display device of a plurality of elements belonging to a list in response to a movement made on said touch interface.

By way of example, the system is a touch-sensitive remote control when the elements are video streams broadcast by TV channels.

In a particular embodiment, the various steps of the control method are determined by computer program instructions.

Consequently, an embodiment of the invention provides a computer program on a data medium, the program being suitable for being implemented in a control device or more generally a computer, the program including instructions adapted to implementing the steps of a control method as described above.

The program may use any programming language, and may be in the form of source code, object code, or code intermediate between source code and object code, such as in a partially compiled form, or in any other desirable form.

Another aspect of the invention provides a data medium readable by a computer and including instructions of a computer program as mentioned above.

The data medium may be any entity or device capable of storing the program. For example, the medium may comprise storage means such as a read-only memory (ROM), e.g. a compact disk ROM (CD ROM), or a microelectronic circuit ROM, or indeed magnetic recording means, e.g. a floppy disk or a hard disk.

Furthermore, the data medium may be a transmissible medium such as an electrical or optical signal, that may be conveyed by an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other aspects, it is also possible to envisage that the control method, the control device, and the system of the invention present in combination all or some of the above-mentioned characteristics.

BRIEF DESCRIPTION OF THE DRAWINGS

Other characteristics and advantages of the present invention appear from the following description made with reference to the accompanying drawings that show an implementation having no limiting character. In the figures.

DETAILED DESCRIPTION OF THE DRAWINGS

As described above, the invention relates to using a touch interface to control how a plurality of elements belonging to a list are displayed on a display device.

In the implementation described herein, consideration is given to controlling the display on a TV screen of a plurality of elements representing video streams, by using a remote control fitted with a touch interface.

Figure 1:
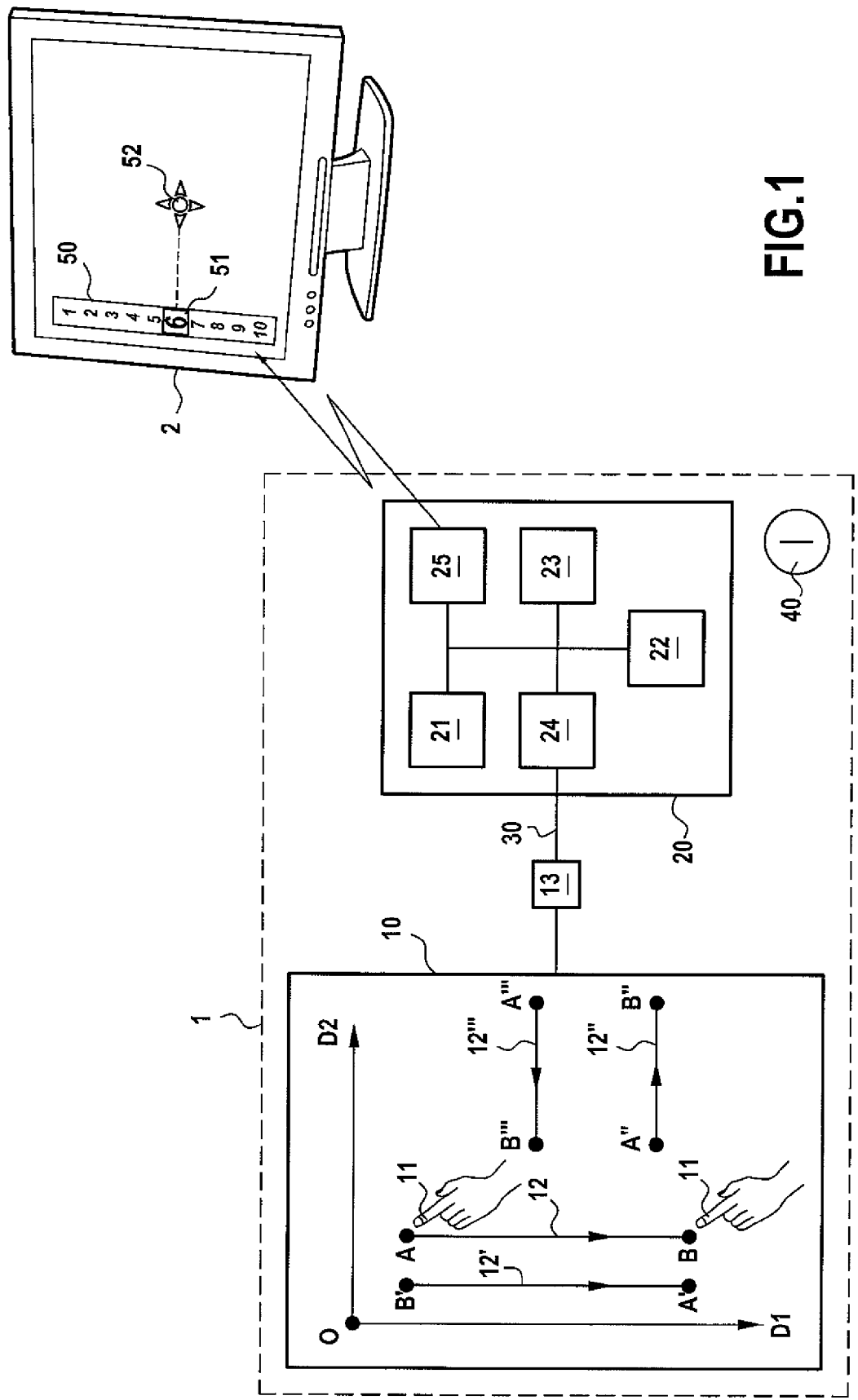
FIG. 1 shows a particular embodiment of a system in accordance with the invention in its environment.

FIG. 1 shows a particular embodiment of a system 1 of the invention in its environment.

The system 1 is a touch remote control suitable for controlling how elements representative of video streams are displayed on a TV screen 2.

By way of example, the elements are TV programs broadcast by a digital television operator (not shown in FIG. 1) and coming from television channels.

The remote control 1 has a capacitive type touch interface 10. The touch interface is provided with a conductive surface made up of a mesh of metal electrodes, together with capacitive sensors (not shown in the figure). These sensors are located at various positions on the conductive surface so as to form a mesh, each sensor being associated with a point having fixed coordinates.

In known manner, a capacitive type touch interface makes use of the principle whereby, when two electrically conductive bodies are very close to each other, their electric fields interact and generate electrical capacitance. One of the bodies may be constituted in particular by a finger 11 of a user of the remote control.

A movement (e.g., 12, 12', or 12") performed by the finger 11 on the touch interface 10 is determined by a driver unit 13 on the basis of the positions (i.e. the coordinates) of the sensors that present capacitance that increases in response to the movement.

It should be observed that in this example the driver unit 13 is also suitable for analyzing the number of metal electrodes that are activated on the conductive surface to determine the contact (or touch) area of the finger 11 as it moves. This contact area is representative of the pressure exerted by the finger while it moves.

In a variant, the touch interface 10 may be provided with independent pressure sensors. It is also possible to envisage other types of touch interface, such as a resistive type touch interface, for example.

The remote control 1 is also provided with a control device 20 in accordance with the invention. The touch interface 10 and the control device 20 are connected together via a data link 30 of conventional type (e.g. an electric cable).

In the example described, it should be observed that the touch interface 10 and the control device 20 are both located in the remote control 1. In a variant, the touch interface 10 and the control device 20 may be incorporated in distinct pieces of equipment and may communicate with each other via a wired or wireless communications interface, e.g. an interface of the WiFi® (Wireless Fidelity), Bluetooth®, ZigBee®, etc. type.

Similarly, the driver unit 13 may be incorporated in the control device 20.

The control device 20 presents hardware architecture of computer type.

In particular, it comprises a processor 21, a random access memory (RAM) 22, and a ROM 23.

The ROM 23 constitutes a recording medium in accordance with the invention that can be read by the processor 21 of the control device and that has recorded thereon a computer program in accordance with the invention. The program includes in particular instructions for executing steps of a control method of the invention, as described below with reference to FIG. 2.

The control device 20 also has communications means 24 for communicating with the driver unit 13 of the touch interface 10 via the data link 30.

It also has communications means 25 for sending control signals to the TV screen 2 in response to movements exerted on the touch interface. These communications means 25 comprise a Bluetooth interface, in this example. The screen 2 is also provided with such an interface.

In a variant, other communications interfaces could be envisaged for the remote control 1 and the screen 2, e.g. such as a ZigBee interface or a WiFi interface. With a touch screen, such a communications interface is nevertheless not essential, since the display of the list and the control device are then controlled by the same equipment.

In accordance with the invention, two distinct axes D1 and D2 are used firstly for scrolling the list of video streams (i.e. programs) made available by the digital TV operator, and secondly for causing elements to be displayed in various display modes. Naturally, a certain amount of departure of the movements from these axes D1 and D2 is tolerated, in application of predetermined tolerance margins.

In this example the axes D1 and D2 are perpendicular, D1 designating a axis that is vertical relative to the orientation of the touch remote control 1 shown in FIG. 1, and D2 being a horizontal axis. D1 and D2 constitute respectively a scroll axis and a trigger axis in the meaning of the invention.

In the description below, the axis D1 is referred to as the scroll axis while the axis D2 is referred either as the display mode modification axis or as the trigger axis.

These axes are stored in the ROM 23 of the control device 20.

The axis D1 is also associated in the ROM 23 with a movement direction (here downwards) suitable for causing the list to scroll, with movement in the opposite direction serving to activate a reevaluation of the speed at which the list 50 scrolls so as to slow it down.

Similarly, the axis D2 is associated in the ROM 23 with movement in one direction (here from left to right) suitable for triggering a new display mode, movement in the opposite direction being suitable for ending the previously activated display mode.

Figure 2:
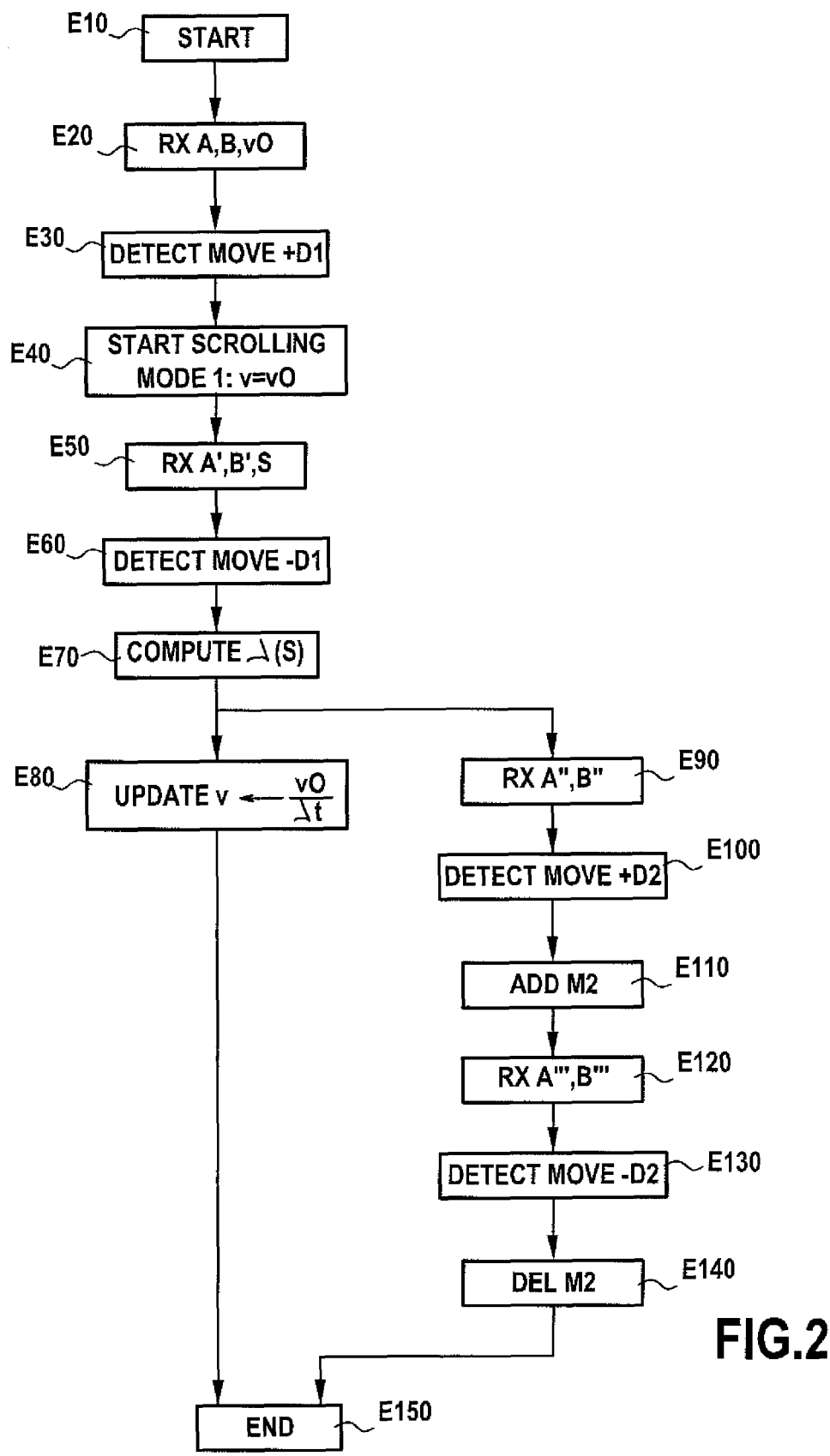
FIG. 2 is a flow chart showing the main steps of the control method of the invention in a particular implementation as implemented by the system shown in FIG. 1.

With reference to FIG. 2, there follows a description of the main steps of the control method of the invention in the particular circumstance of it being implemented by the control device 20 of FIG. 1.

It is assumed that the user of the touch remote control 1 desires to access a program broadcast by the digital TV operator. For this purpose, the user switches on the TV set by operating an on/off button 40 situated on the remote control (step E10).

In a variant, the user may perform a specific movement on the touch interface 10, that is associated in unique manner with switching-on the remote control.

In response to another command issued by the user (a specific movement of the touch interface 10 or pressing on a dedicated button of the remote control 1), the remote control 1 sends a control signal to the screen 2 via its interface 25 so as to cause the screen to display the list 50 of programs made available by the operator. The channel currently being broadcast is identified in a stationary zone 51, referred to as the focus zone.

A cursor 52 also appears on the screen 2, seeking to inform the user that the display of the list can be controlled by applying movement to the touch interface 10 along the axis D1 and/or the axis D2.

Assume that the user applies a movement 12 to the touch interface 10 with a finger 11 starting from a first contact point A and going to a second contact point B. The movement 12 is exerted downwards along the axis D1 at a speed v0.

The movement 12 is detected by the driver unit 13 by analyzing the capacitances of the sensors of the touch interface. An increase in the capacitance of some of the sensors is representative of contact being made with the touch interface. The driver unit 13 deduces the coordinates of the contact points A and B from the positions of the sensors.

It also evaluates the speed v0 of the movement 12. The means implemented by the driver unit 13 for this purpose are themselves known and are not described in greater detail herein. Such means are described in particular in document WO 2008/000435.

The coordinates of the points A and B and the speed v0 are forwarded by the driver unit 13 to the control device 20 via the data link 30.

On receiving this data (step E20), the control device 20 evaluates the axis and the direction of the movement 12 exerted on the touch interface on the basis of the coordinates of points A and B.

Then the axis as evaluated in this way is compared with the scroll axis D1 and the trigger axis D2 as stored in the ROM 23.

The control device 20 detects that the movement 12 in this example was exerted along the scroll axis D1 in the downward direction (step E30).

In response to this movement, it triggers scrolling of the list 50 on the screen 2 along the scroll axis D1 in the downward direction (step E40).

To do this, the control device 20 sends a control signal to the screen 2 via its infrared communications means 25.

This control signal comprises a command for triggering scrolling of the elements of the list in a first display mode M1, together with the characteristics of the first display mode M1. Such a control signal is itself known and is not described in greater detail herein.

In the example described herein, first display mode M1 consists in displaying the channel broadcasting the element in the focus zone 51. On receiving this control signal, the screen 2 causes the elements of the list to scroll in the first display mode M1.

Figure 3A:
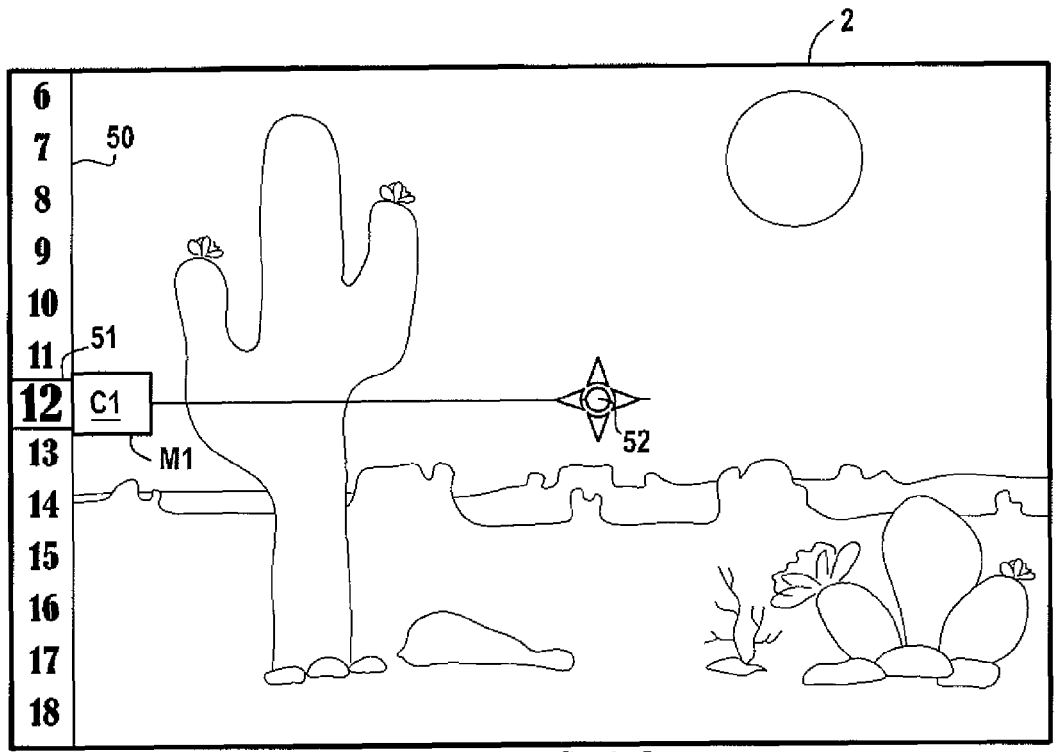
FIGS. 3A to 3D show examples of display modes that may be triggered when implementing the control method of the invention.

FIG. 3A illustrates the scrolling of the programs of the list 50 on the screen 2 in the first display mode. In this first display mode, the channel C1 associated with the program 12 situated in the focus zone 51 is displayed.

The list is caused to scroll at a speed v, and it simulates the rotation of a wheel having the list marked on its periphery. The scrolling speed v in this example depends on the speed v0 of the movement 12. More precisely, it is taken initially to be equal to the speed v0.

Thereafter, a deceleration coefficient is applied to this speed v so as to slow it down progressively. This deceleration coefficient seeks to impart an inertial principle to the scrolling of the elements so as to reproduce the behavior of a physical wheel. The term "inertial" is used to designate deceleration that is non-linear and that depends on the initial scrolling speed and on the deceleration coefficient.

In the presently-described implementation, the deceleration of the scrolling speed v is triggered in response to a slowing down movement 12' exerted on the touch interface 10 along the axis D1 and in the opposite direction to the movement 12 that caused the list 50 to scroll. With reference to FIG. 1, the movement 12' starts from point A' and goes to point B', i.e. it takes place upwards.

As a result, the user can easily act a posteriori to control the speed at which the elements of the list scroll and optionally stop scrolling when the selected program is coming up to the focus zone 51.

The movement 12' is detected by the driver unit 13 in similar manner to the movement 12.

The driver unit in this example also determines the pressure exerted on the touch interface by the user's finger 11 while making the movement 12'.

This pressure is evaluated from the contact area S of the finger 11 on the touch interface 10 as exerted during the movement 12'. In known manner, the greater the contact area S', the harder the user is pushing on the touch interface 10 and the greater the pressure value that is taken into consideration.

For more ample details on calculating the contact area on a touch interface and taking this area into account as being representative of the pressure exerted on the touch interface, the person skilled in the art is invited to refer to the document entitled "Design and comparison of acceleration methods for touchpad", S. Yun and G. Lee, Conference on Human Factors in Computing Systems, 2007.

The coordinates of the points A' and B' and the contact area S are then forwarded by the driver unit 13 to the control device 20 via the data link 30.

On receiving this data (step E50), the control device 20 evaluates the axis along which the movement 12' is exerted on the touch interface, and also the direction of this movement, on the basis of the coordinates of the points A' and B'.

Here the control device 20 detects that the movement 12' was exerted in the upward direction along the scroll axis D1 (step E60).

As mentioned above, detecting such a movement is appropriate for triggering non-linear deceleration of the scrolling of the list in application of a deceleration coefficient $\lambda$.

Here the deceleration coefficient $\lambda$ depends on the pressure exerted on the touch interface while performing the movement 12', i.e. on the contact area S: it is taken to be equal to the area S (step E70).

In response to the movement 12', the scrolling speed is then updated by the control device 20 at various instants t, in application of the following equation (step E80):

$$v = \frac{v0}{\lambda t} = \frac{v0}{St}$$

The speed v as updated in this way is then sent to the screen 2 at the various instants t, in a control signal.

On receiving this signal, the screen 2 applies the speed v contained in this signal as the scrolling speed for the elements of the list.

In a variant, the deceleration coefficient applied to the speed v may depend on the amplitude of the movement 12' (typically its length). However it is also possible to take a predetermined deceleration coefficient into consideration that is independent of the movement performed on the touch interface.

Other deceleration schemes may also be used to slow down the scrolling speed v.

It should be observed that other implementations may be envisaged, in which it is possible to stop the scrolling of the elements of the list 50, e.g. by tapping on the touch interface 10. Similarly, it is possible to envisage deactivating or stopping deceleration of the speed by means of some particular predetermined gesture, such as a long press exerted on a contact point of the touch interface (e.g. on the last point of contact).

It is now assumed that while the elements of the list 50 are scrolling, the user desires to access display modes other than the mode M1.

For this purpose, the user performs a new movement 12" with the finger 11 on the touch interface 10. The movement 12" starts from a first contact point A" and goes to a second contact point B". It is performed from left to right along the axis D2 perpendicular to the scroll axis D1.

The movement 12" is detected by the driver unit 13 in a manner similar to detecting the movements 12 and 12'. The coordinates of the points A" and B" are then forwarded thereby to the control device 20, via the data link 30.

On receiving this data (step E90), the control device 20 evaluates the axis and the direction of the movement 12" performed on the touch interface on the basis of the coordinates of the points A" and B".

It compares the axis as evaluated in this way with the scroll axis D1 and with the trigger axis D2 as stored in the ROM 23.

The control device 20 thus detects the movement 12' was exerted along the trigger axis D2 (step E100) from left to right.

In response to this movement, the control device causes the elements of the list to be displayed on the screen 2 in a second display mode M2, in addition to the first display mode M1 (step E110).

Depending on the implementation, in the second display mode, information additional to that displayed in the first display mode is also displayed, at least for one of the elements of the list. For example, this may comprise information that is more detailed or of some other nature, such as photographs additional to the text information presented in the first display mode.

In another implementation, in the second display mode, for at least one element of the list, there is displayed at least one user interface element suitable for use in triggering the execution of a function associated with said element of the list. By way of example, the function may be: switching the TV to a channel when the list is a list of programs or channels; opening a file for editing when the list is a list of data files; paying back a multimedia file when the list is a list of multimedia files; etc.

In order to trigger the display of elements of the list on the screen 2 in the second display mode, the control device 20 sends a new control signal via its infrared communications means 25 to the screen 2.

This control signal comprises a command for triggering the second display mode M2, together with the characteristics of the second display mode M2. In the presently-described example, the second display mode M2 consists in displaying a thumbnail of the program in the focus zone 51.

On receiving this control signal, the scrolling of the elements in the list appears on the screen 2 using both the first and the second display modes M1 and M2.

Figure 3B:
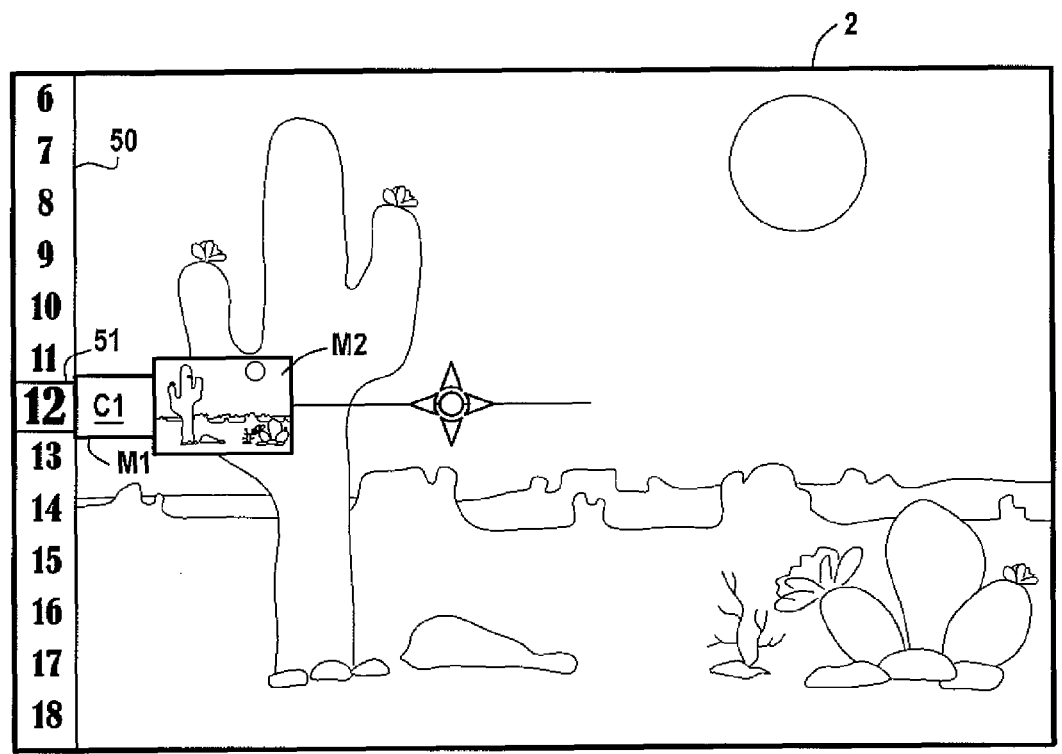

FIG. 3B illustrates the scrolling of the programs of the list 50 using both modes M1 and M2. When using both of these display modes, the channel C1 and a thumbnail of the program 12 are displayed on the screen 2.

It should be observed that the display in the second mode is triggered while the elements of the list are scrolling. Nevertheless, in a variant, it may take place after the scrolling being stopped.

In general, when the second display mode is activated, is it possible to cause the elements of the list to scroll in response to exerting a movement on the touch interface 10 along the scroll axis D1, with at least one element of the list being displayed in the second display mode while the scrolling is taking place.

The display of this second display mode serves advantageously to enrich the elements of the list as presented to the user on the screen 2.

Naturally, other display modes can be envisaged, either as replacement for the above-described first and second modes, or else in addition thereto.

Figure 3C:
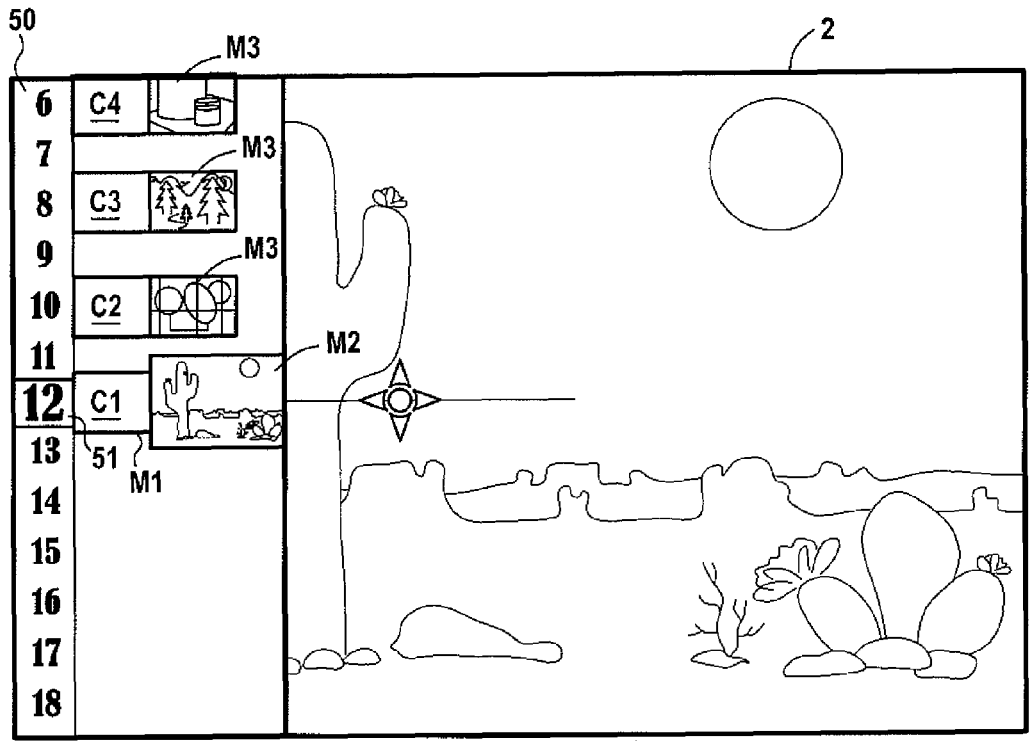
Figure 3D:
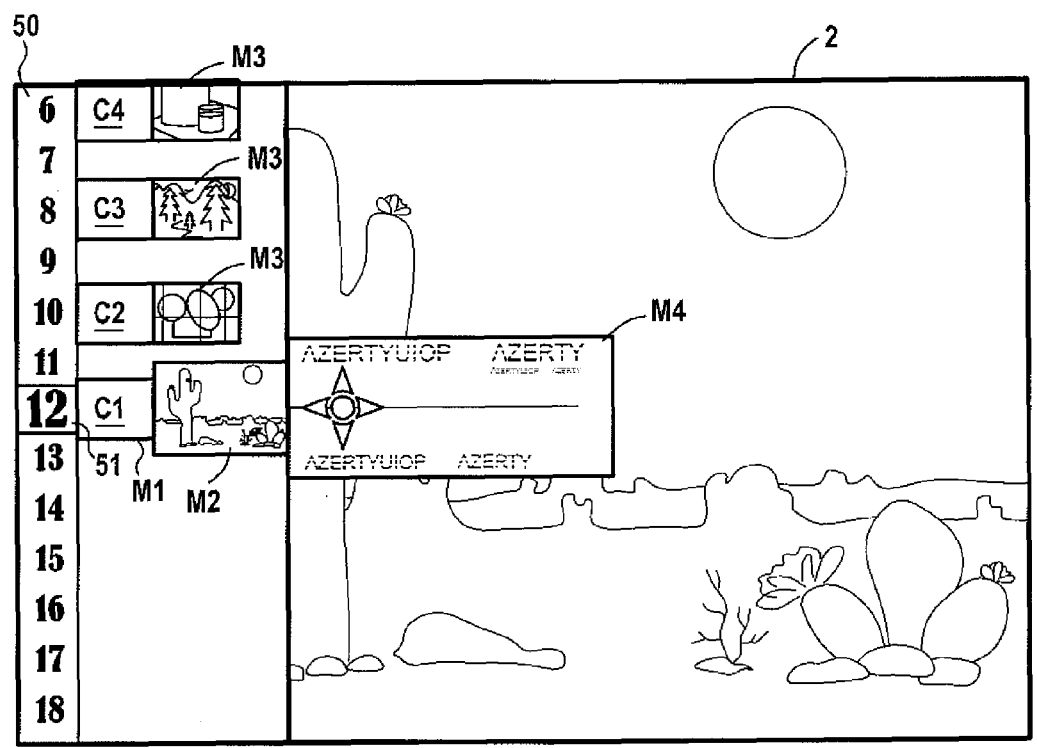

By way of example, FIGS. 3C and 3D thus show respectively third and fourth display modes that may be triggered in a manner similar to the second display mode by the user exerting a movement on the touch interface along the trigger axis D2 from left to right.

The third display mode shown in FIG. 3C consists in displaying thumbnails M3 of a plurality of programs in the list, and in contrast to the second display mode not only the single program situated in the focus zone 51. For reasons of clarity, only a few elements are shown in FIG. 3C.

The fourth display mode M4 shown in FIG. 3D consists in displaying information on the screen 2 relating to the program situated in the focus zone 51. By way of example, this information may comprise the title of the program, its duration, etc.

Still while scrolling elements of the list 50, it is now assumed that the user seeks to terminate the display of the second mode M2.

For this purpose, the user makes a new movement 12''' with a finger 11 on the touch interface 10, starting from a first contact point A''' and going to a second contact point B'''. This time the movement is performed from right to left along the axis D2 perpendicular to the scroll axis D1, i.e. it is done in the direction that is opposite to the direction used for triggering the second, display mode.

The movement 12''' is detected by the driver unit 13 in similar manner to the movements 12, 12', and 12". The coordinates of the points A''' and B''' are then forwarded to the control unit 20 via the data link 30.

On receiving this data (step E120), the control device 20 evaluates the axis and the direction of the movement 12''' performed on the touch interface on the basis of the coordinates of the points A''' and B'''.

It compares the axis as evaluated in this way with the scroll axis D1 and with the trigger axis D2 stored in the ROM 23.

The control device 20 thus detects that the movement 12''' was exerted along the trigger axis D2 in the right to left direction (step E130).

In response to this movement, it terminates the display of elements of the list on the screen 2 in the second display mode M2, while conserving the display in the first display mode M1 (step E140).

For this purpose, the control device 20 sends a new control signal via its infrared communications means 25 to the screen 2.

This control signal comprises a command for deactivating the second mode M2.

On receiving this control signal, the scrolling of the elements of the list as they appear on the screen 2 in the second display mode M2 is stopped, leaving only the scrolling of the list in the first display mode M1 to appear.

The control method of the invention ends when the scrolling of the list stops (step E150), e.g. because the user has selected the program for viewing by tapping on the touch interface 10 when that program appears in the focus zone 51. A movement triggering further scrolling of the list or a new display mode may then be performed by the user on the touch interface 10, thus causing the control method of the invention to be implemented once more.

It should be observed that in the implementation described above, the movements 12 and 12'' are performed in succession. Nevertheless, in another embodiment, the control device 20 may be configured to interpret a movement that is performed on the touch interface along an axis D that has components parallel both to the axis D1 and to the axis D2. Tolerance thresholds are naturally provided concerning the axes D1 and D2, and a movement along the axis D is interpreted as triggering both the scrolling of elements of the list and the display of a second display mode if the axis D is sufficiently distinct from either of the axes D1 and D2 taken individually, i.e. if it lies outside predefined tolerance thresholds.

Under such circumstances, the control signal sent by the control device 20 to the screen 2 contains not only a command for triggering the scrolling of the elements of the list, but also a command for triggering the display of these elements in both the first and the second display modes.

The invention is applicable to any type of list. The elements of the list may be constituted in particular by multimedia contents such as video streams, images, applications, data files, etc., and the display device may be a screen, e.g. a computer screen or a TV screen.

The invention is applicable to any type of touch interface, in particular a touchpad or a touch screen.

The axes for controlling scrolling and for modifying (or triggering) the current display mode may be selected arbitrarily, i.e. horizontal or vertical. Along each axis, two movement directions are preferably detectable: downwards or upwards, from left to right or from right to left, etc.

These movement axes and directions as detected may also be adapted to the desires of the user depending on whether the user is left-handed or right-handed, or indeed they may be adapted to where the list is located on the screen: if the list is in the right-hand portion of the screen (or conversely in the left-hand portion), it may be more natural to develop display modes by going to the right (or on the contrary to the left) and to select a display mode modifying direction or axis that is the most appropriate for each configuration.

The invention enables management of the space available on the display screen to be optimized. It enables different levels of information to be managed using the different display modes.

Figure 4A:
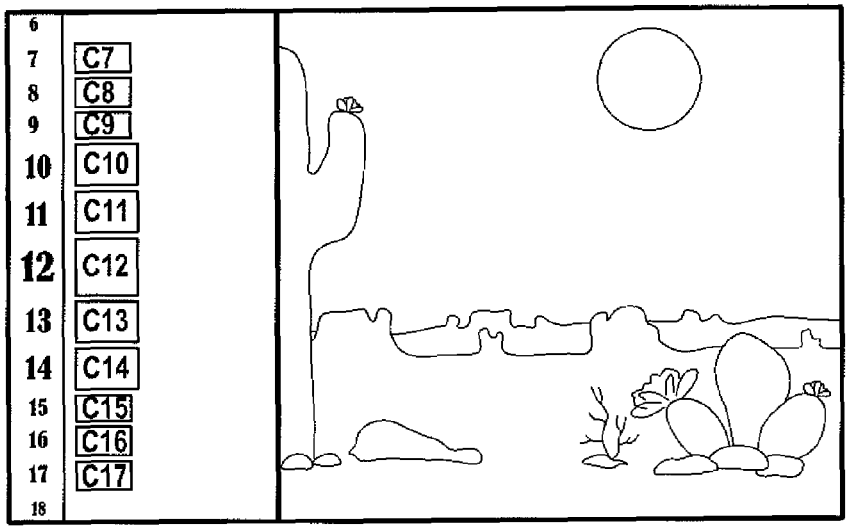
FIGS. 4A to 4C show other examples of display modes that may be triggered when implementing a control method according to an embodiment of the invention.
Figure 4B:
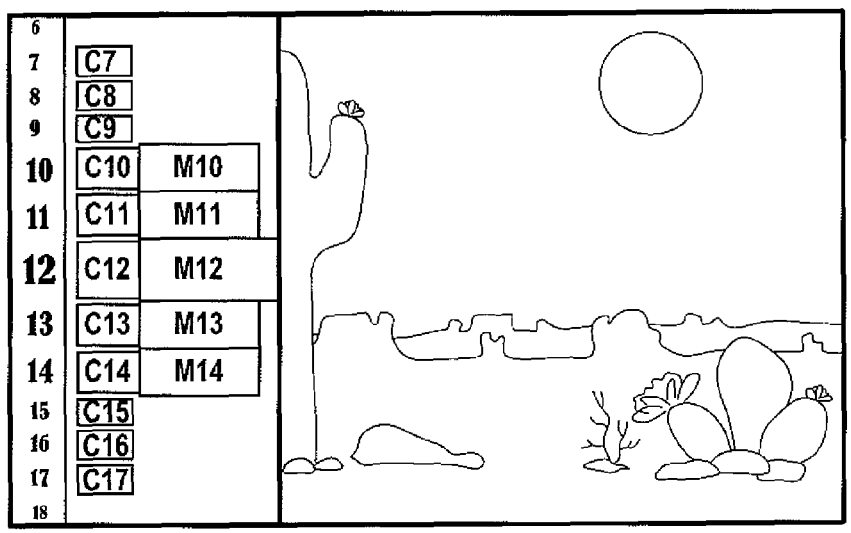
Figure 4C:
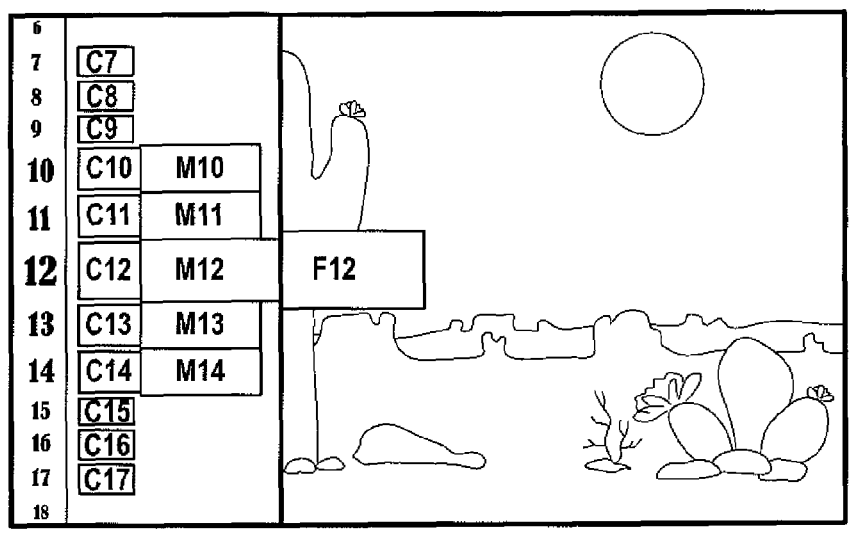

FIGS. 4A-4C show another way of organizing the user interface for three display modes. The mechanisms for activating the various display modes and scrolling are identical to those described with reference to FIGS. 3A to 3D.

As described above with reference to FIGS. 3A to 3D, in the second display mode, information additional to that displayed in the first display mode is displayed for at least one of the elements in the list in response to a movement being performed on the touch interface along a trigger axis that is distinct from the list scroll axis. The information displayed in the first mode is said to be first-level information. The additional information displayed in the second mode for at least one element is said to be second-level information.

Similarly, in the third display mode, information is displayed additional to that displayed in the second display mode for at least one of the elements of the list in response to a movement exerted on the touch interface along a trigger axis that is distinct from the list scroll axis. This additional information displayed in the third mode for at least one element is said to be third-level information.

In the first display mode shown in FIG. 4A, first level of information is available. In a user interface for TV channels, this first level of information may correspond for example to a channel number (6 to 18) and/or a logo C7-C17 associated with the television channel in question.

In the second display mode, shown in FIG. 4B, a second level of information is available for one or more of the elements of the list. In a user interface for television channels, this second level of information corresponds for example to a thumbnail M10-M14 corresponding to an image representative of or extracted from the video stream that is being broadcast by the television channel under consideration.

In the third display mode, shown in FIG. 4C, a third level of information is available for one or more of the elements of the list. In a user interface for TV channels, this third level of information corresponds for example to an information sheet F12 about the program being broadcast by the television channel under consideration.

As shown in FIGS. 4A to 4C, in order to be able to display second-level information without reducing the size and the legibility of the first-level information, the display area occupied for an element of the list in order to display information about said element increases on switching from the first display mode to the second display mode so that both first- and second-level information is displayed for said element.

For example, in FIG. 4A, in the first display mode, the device area occupied for channel 10 is that occupied by the logo C10 and the channel number 10. As shown in FIG. 4B, in the second display mode, additional area is occupied for the channel 10 by the thumbnail M10.

In one implementation, if necessary because of the size of the screen or if other information needs to remain visible while the user is causing the list to scroll in the various display modes, provision is made in the second display mode for this increase in display area occupied for at least one predefined element, to take place simultaneously with a reduction in the number of elements in the list for which both first- and second-level information is displayed (the five TV channels 10 to 14) compared with the total number of elements in the list (the 11 TV channels 7 to 17) for which first-level information is displayed.

Thus, as the quantity of information displayed about certain elements of the list increases and as the display area occupied in this way likewise increases, the total display area occupied for displaying information about the elements in the list is limited by limiting the number of elements in the list for which second-level information is made available in the second display mode.

FIG. 4B thus shows that only TV channels 10 to 14 have second-level information displayed, i.e. have a respective thumbnail M10 to M14 displayed. To summarize, the information of the first level (channel number and logo) is used for the elements of a first fraction of the list (television channels 7 to 17), while the information of the second level (thumbnail) is used only for a second fraction (television channels 10 to 14) that is included within and distinct from said first fraction.

This optimized management of the space available on the display screen is applicable on the same principles to the third display mode:

the display area occupied to display information about an element of the list increases for said element on switching from the second display mode to the third display mode so that information for said element is displayed simultaneously at the first level, at the second level, and at the third level; and the number of elements in the list for which information is displayed at the first, second, and third levels (only the television channel associated with channel 12) is smaller than the number of elements in the list for which information is displayed at the first and second levels.

For example, in FIG. 4B, in the second display mode, the display area occupied by channel 12 is the area occupied by the logo C12, the channel number 12, and the thumbnail M12. As shown in FIG. 4C, in the third display mode, there is added thereto the area occupied by the information sheet F12 for the channel 12.

FIG. 4C also shows that only television channel 12 has third-level information being displayed, i.e. an information sheet F12. To summarize, third-level information (information sheet) is used only for a third fraction (comprising solely the television channel associated with channel 12) that is included within and distinct from the second portion (television channels 10 to 14).

In a variant, and still for optimizing the display area that is occupied, a zoom and/or a different representation mode is used in the first display mode for those elements of the list that constitute the second fraction, as included within the first fraction, whenever the second display mode is activated. The user thus knows for which elements of the list it is possible to obtain information at the second level by switching from the first display mode to the second display mode. When the user actually actuates the second display mode, this zoom or this different representation mode is either maintained or is eliminated.

By way of example, this zoom is effected by using a character font size that is greater if the information concerned comprises text, and by using a thumbnail of greater size. A different mode of representation is effected, for example, by using a different color palette and/or additional or different outlining or marking graphics elements.

As an alternative to zooming on the elements of the second portion, a different mode of representation (using different colors and/or different outlining or marking graphics elements, etc.) is used for the elements of the second portion so as to distinguish them from the elements of the first portion that do not belong to the second portion.

For example, in FIG. 4A or 4B, channels 10 to 14 have a logo C10 to C14 that is of larger size (wider and taller) than do channels 6 to 9 or 15 to 18. The font size used for the channel numbers 10 to 14 is greater than that used for the channel numbers 6 to 9 or 15 to 18. When the user is in the first display mode (FIG. 4A), the user thus knows that additional information can be obtained about channels 10 to 14 by activating the second display mode (FIG. 4B).

The above description concerning zoom or representation mode is transposable to the third display mode. A different zoom and/or representation mode is used in the second display mode (and possibly also in the first display mode) for those elements of the list that belong to the third fraction, which is included in the second fraction, and for which the third display mode can be activated. The user thus knows which are the elements in the list for which it is possible to obtain information at the third level by switching from the second display mode to the third display mode. When the user actually actuates the third display mode, this different zoom or representation mode may be maintained or eliminated.

For example, in FIG. 4B or 4C, channel 12 has a thumbnail M12 that is greater than that of channels 10, 11, 13, and 14. In addition, the font size used for channel number 12 is greater than that used for channel numbers 10, 11, 13, and 14. When the user is in the second display mode (FIG. 4B), the user thus knows that it is possible to obtain additional information about channel 12 by actuating the third display mode (FIG. 4C). The logo C12 is also larger (wider and taller) than the logo C9 and than the logos C10, C11, C13, or C14. The font size used for channel 12 is greater than that used for channels 6 to 9 or 15 to 18 or for channels 10, 11, 13, or 14.

The information is described above in detail in its application to a list of audiovisual contents, however it can be generalized to any list of elements, regardless of the nature of said elements: a multimedia contents list; a data file list; a list of contacts for an address book; a software list; etc.

What is claimed is:

1. A control method for controlling the display on a display device of a plurality of elements belonging to a list, wherein, in a first display mode, information is displayed for said elements of the list, with the element of said list together with said information being caused to scroll in the first display mode in response to a movement made on a touch interface along a determined scroll axis;

wherein, starting from the first display mode, said device is caused to consecutively enter multiple additional display modes, wherein in each consecutive display mode, the information for all of the elements of the list which were displayed in each of the prior display modes remains displayed simultaneously with additional information for a number of the elements of the list which is smaller than a number of the elements of the list for which information was displayed in each of the prior display modes, the additional display modes being triggered in response to a movement made on the touch interface along a trigger axis distinct from the list scroll axis, in a single direction of movement.

2. The control method according to claim 1, wherein said additional display modes comprise a second display mode, and wherein, in response to a movement made on the touch interface along the scroll axis, there is triggered scrolling of the elements of said list, during which additional information for at least one element of said list which was displayed in said first display mode is displayed in the second display mode.

3. The control method according to claim 1, wherein, said additional display modes comprise a third display mode in which there is displayed for at least one element of the list, at least one user interface element suitable for use in triggering the execution of a function associated with said element of the list.

4. The control method according to claim 1, wherein the trigger axis for triggering the display of the second mode is perpendicular to the scroll axis for scrolling the list.

5. The control method according to claim 1, wherein said additional display modes comprise a second display mode and wherein display of the second display mode is terminated in response to a movement made on the touch interface along said trigger axis in a direction opposite to said single direction of the movement made for triggering the display of the second mode.

6. The control method according to claim 1, wherein the scrolling speed of the elements of said list depends on the speed of the movement made on the touch interface along the scroll axis.

7. The control method according to claim 6, wherein a deceleration coefficient is applied to the scroll speed of the elements of said list so as to slow down said scroll speed progressively.

8. The control method according to claim 6, wherein the scroll speed of the elements of said list is slowed down in response to a slow-down movement made on the touch interface along the scroll axis and in a direction opposite to the direction of the movement that caused said list to scroll.

9. The control method according to claim 8, wherein the scroll speed is slowed down as a function of the pressure exerted on the touch interface during the slow-down movement.

10. A non-transitory computer-readable medium including instructions for executing the control method according to claim 1 when said instructions are executed by a computer.

11. The control method according to claim 1 wherein said movements along said scroll axis and trigger axis are made on a touch interface of a remote control distinct from said display device.

12. The control method according to claim 1, wherein said additional display modes comprise a second display mode, and wherein the second display mode is triggered in response to said movement made on the touch interface along a trigger axis while said elements of said list are being scrolled.

13. A control device for controlling the display on a display device of a plurality of elements belonging to a list, wherein, in a first display mode, information is displayed for said elements of the list, said device including a processor configured to enable the elements of the list together with said information to scroll in the first display mode on the display device in response to a movement made on a touch interface along a determined scroll axis, wherein the processor is further configured to act, starting from the first display mode, to consecutively trigger a display of said list on said device in additional display modes, wherein in each consecutive display mode, the information for all of the elements of the list which were displayed in each of the prior display modes remains displayed simultaneously with additional information for a number of the elements of the list which is smaller than a number of the elements of the list for which information was displayed in each of the prior display modes, the additional display modes being triggered in response to a movement made on the touch interface along a trigger axis that is distinct from the list scroll axis, in a single direction of movement.

14. The control device according to claim 13, wherein said additional display modes comprise a second display mode and wherein said processor is further configured to terminate the display of the second display mode in response to a movement made on the touch interface along said trigger axis, in a direction opposite to the direction of the movement made for triggering the display of the second mode.

15. The control device according to claim 13, wherein said processor is further configured to determine the scrolling speed of the elements of said list as a function of the speed of the movement made on the touch interface along the scroll axis.

16. A system comprising:
a touch interface; and
a control device according to claim 13, suitable for controlling the display on a display device of a plurality of elements belonging to a list in response to a movement made on said touch interface.

17. The control device according to claim 13 wherein said control device is comprised in a remote control distinct from said display device.

18. A remote control comprising:
a touch interface;
a control device according to claim 13, suitable for controlling the display on a remote display device of a plurality of elements belonging to a list in response to a movement made on said touch interface.

* * * * *